United States Patent
Zhao et al.

(10) Patent No.: US 11,750,078 B2
(45) Date of Patent: Sep. 5, 2023

(54) ADAPTIVE OFF-TIME OR ON-TIME DC-DC CONVERTER

(71) Applicant: TEXAS INSTRUMENTS INCORPORATED, Dallas, TX (US)

(72) Inventors: Wei Zhao, Shanghai (CN); Jianzhang Xie, Shanghai (CN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 16/876,897

(22) Filed: May 18, 2020

(65) Prior Publication Data

US 2021/0211047 A1 Jul. 8, 2021

Related U.S. Application Data

(63) Continuation of application No. PCT/CN2020/070110, filed on Jan. 2, 2020.

(30) Foreign Application Priority Data

Jan. 2, 2020 (WO) ................ PCT/CN2020/070110

(51) Int. Cl.
*H02M 1/08* (2006.01)
*H02M 3/158* (2006.01)
*H02M 1/00* (2006.01)

(52) U.S. Cl.
CPC ........... *H02M 1/08* (2013.01); *H02M 1/0041* (2021.05); *H02M 3/158* (2013.01); *H02M 1/0025* (2021.05)

(58) Field of Classification Search
CPC ....... H02M 1/0041; H02M 1/08; H02M 3/158
See application file for complete search history.

(56) References Cited

U.S. PATENT DOCUMENTS 8,598,856 B1* 12/2013 Carroll ................ H02M 3/1588
323/284
10,992,231 B1* 4/2021 Yang ................... H02M 1/0025
(Continued)

FOREIGN PATENT DOCUMENTS

| CN | 101540548 A | 9/2009 |
| CN | 102714462 A | 10/2012 |
| CN | 103378740 A | 10/2013 |

OTHER PUBLICATIONS

Search Report for PCT Application No. PCT/CN2020/070110, date of mailing of international search report dated Sep. 30, 2020, 3 pages.

(Continued)

*Primary Examiner* — Alex Torres-Rivera
(74) *Attorney, Agent, or Firm* — Charles F. Koch; Frank D. Cimino

(57) ABSTRACT

A converter system includes a first switch and a controller configured to switch the first switch between first and second states based on input and output voltages of the converter system, wherein the controller includes: a timer unit including a first timer configured to determine a first duration based on a target switching frequency of the converter system, and a second timer configured to determine a second duration based on a predetermined duration equal to or greater than a minimum duration of the first state of the first switch and the input and output voltages; and a control logic unit, configured to switch the first switch from the second state to the first state upon expiration of both the first and second durations.

16 Claims, 11 Drawing Sheets

(56) References Cited

U.S. PATENT DOCUMENTS

| | | |
|---|---|---|
| 2005/0134247 A1 | 6/2005 | Lipcsei et al. |
| 2008/0088284 A1* | 4/2008 | Weng .................. H02M 3/1563 323/271 |
| 2009/0140708 A1 | 6/2009 | Tateishi et al. |
| 2013/0009557 A1 | 1/2013 | Szczeszynski |
| 2017/0302180 A1 | 10/2017 | Villar Piqué |

OTHER PUBLICATIONS

English machine translation for CN101540548A, 20 pages.
English machine translation for CN102714462A, 52 ages.
English machine translation for CN103378740A, 22 pages.
First Office Action in Chinese counterpart Application No. 202080091587.5, dated May 25, 2023.
CN101540548A Machine translation.

\* cited by examiner

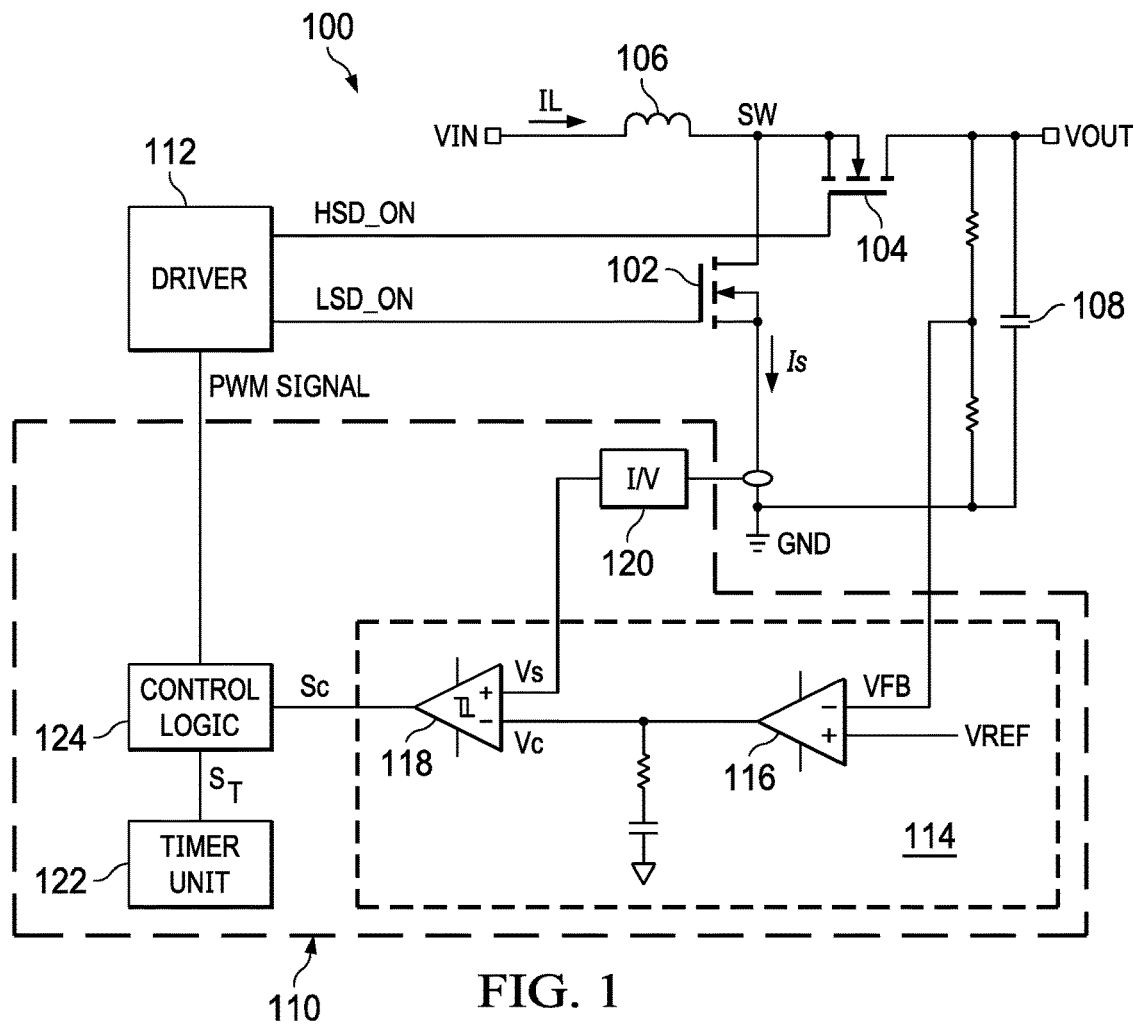
FIG. 1
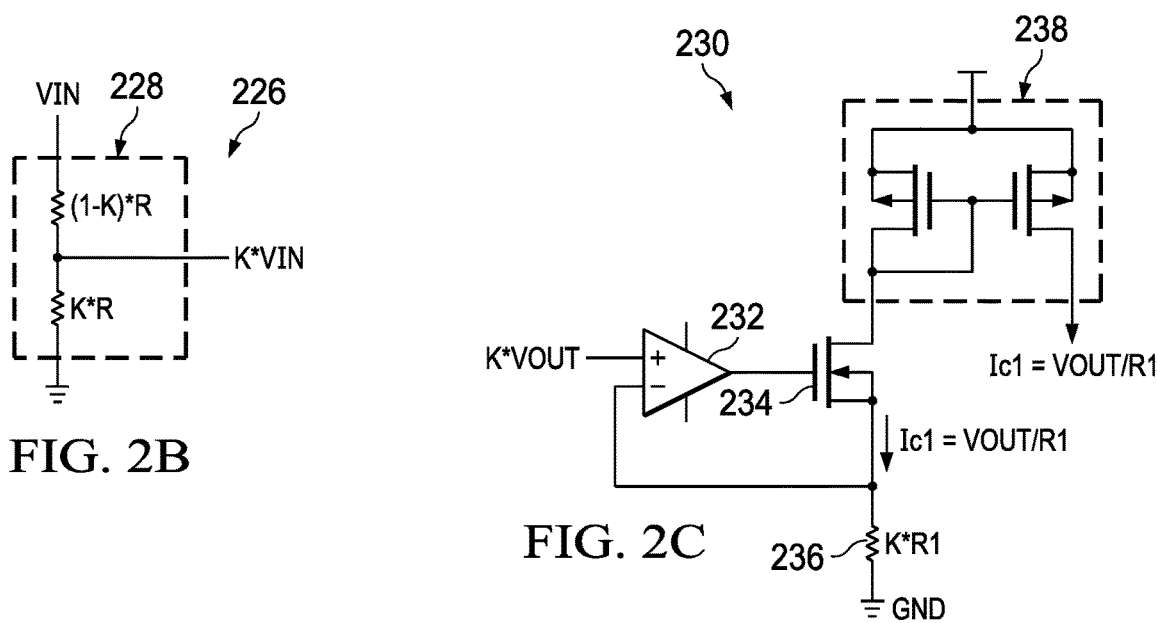
FIG. 2B
FIG. 2C

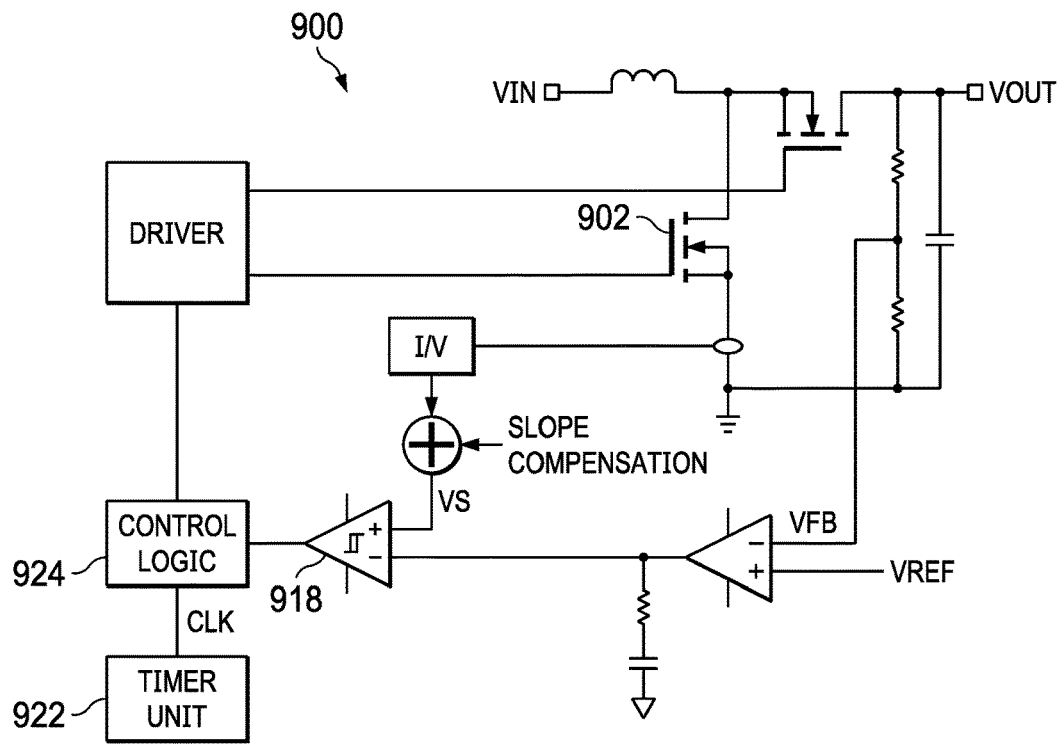
FIG. 9
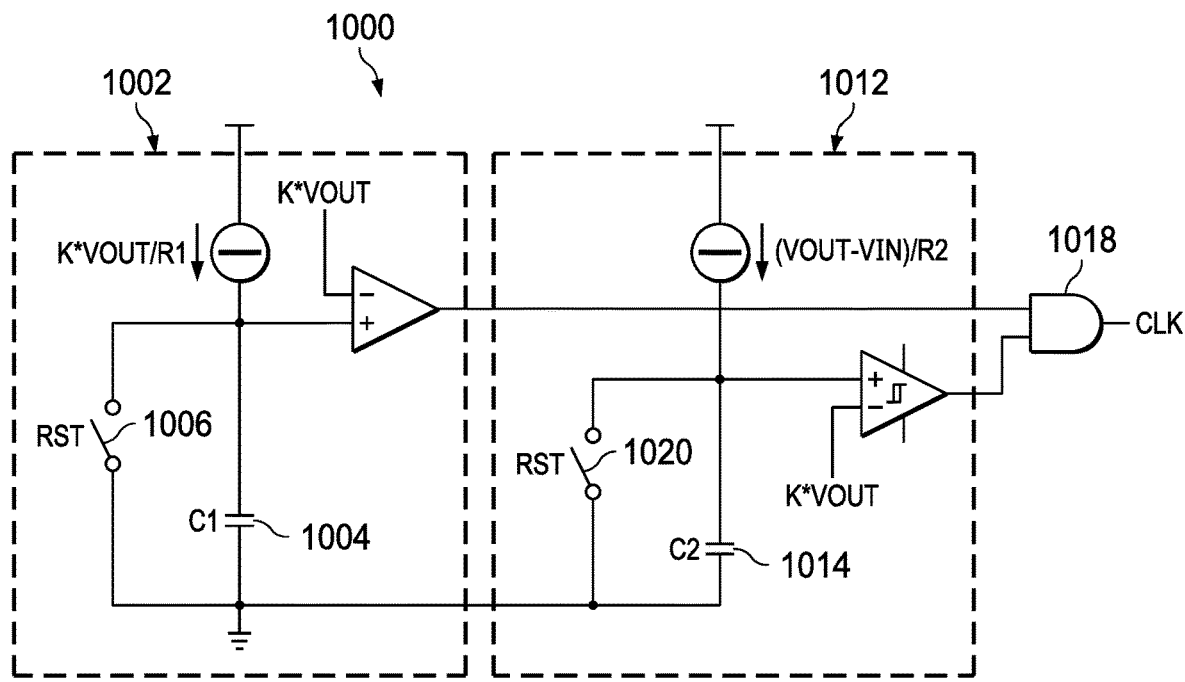
FIG. 10
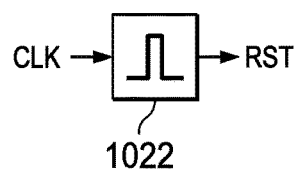

US 11,750,078 B2

ADAPTIVE OFF-TIME OR ON-TIME DC-DC CONVERTER

TECHNICAL FIELD

The present disclosure relates to integrated circuits and, more particularly, to a current mode DC-DC converter system.

BACKGROUND

DC-DC converters are widely used to convert an input DC voltage to a desired output DC voltage to drive a load. A current mode DC-DC converter may include a current loop that determines on or off time of a switch in each switching cycle by sensing an inductor current flowing through an inductor that is coupled to a switch node of the DC-DC converter, thereby regulating the inductor current. In a conventional adaptive on-time or off-time current mode DC-DC converter, a pulse-width-modulation (PWM) signal that controls the switch is regulated based on the sensed inductor current, the on-time or off-time determined based on input and output voltages of the DC-DC converter. In a conventional fixed frequency current mode DC-DC converter, the PWM signal is regulated based on the sensed inductor current, and a clock signal with a fixed target frequency.

SUMMARY

The present disclosure relates to integrated circuits and, more particularly, to a DC-DC converter system with a wider range of duty cycle. A DC-DC converter system, for example, a switch mode DC-DC converter, usually includes a switch operable between on and off states based on a frequency signal, for example, a pulse-width-modulation (PWM) signal, to generate an output DC voltage to a load by periodically storing energy from a source that provides an input DC voltage in a magnetic field of an inductor or a transformer and releasing the energy from the magnetic field. The ratio between the output DC voltage and the input DC voltage is proportional to a duty cycle of the PWM signal.

In one example, the present disclosure provides a DC-DC converter system including a first switch coupled to a switching node and operable between first and second states, and a controller, coupled to the first switch, and configured to switch the first switch between the first and second states based on an input voltage and an output voltage of the DC-DC converter system. The controller includes: a timer unit including a first timer configured to determine a first duration based on a target switching frequency of the DC-DC converter system, a second timer configured to determine a second duration based on a predetermined duration substantially equal to or greater than a minimum duration of the first state of the first switch and the input and output voltages, and logic circuitry coupled to the first and second timers and configured to generate an expiration signal upon expiration of both the first and second durations; and a control logic unit, configured to switch the first switch from the second state to the first state based on the expiration signal.

In another example, the present disclosure provides a controller for switching a first switch of a DC-DC converter system. The controller includes: a timer unit including a first timer configured to determine a first duration based on a target switching frequency of the DC-DC converter system, a second timer configured to determine a second duration based on input and output voltages of the DC-DC converter system and a predetermined duration substantially equal to or greater than a minimum duration of a first state of the first switch, and logic circuitry coupled to the first and second timers and configured to generate an expiration signal upon expiration of both the first and second durations; and a control logic unit, configured to switch the first switch from a second state to the first state based on the expiration signal.

In yet another example, the present disclosure provides a DC-DC converter system including: a first switch coupled to a switching node of the DC-DC converter system and a voltage supply node, and operable between first and second states; a first timer including a first capacitive element with a first capacitance, a first timing switching coupled in parallel with the first capacitive element, a first current source coupled in series with the first capacitive element and configured to source or sink a first current to or from the first capacitive element, and a first comparator with a first input terminal coupled to the first capacitive element, a second input terminal configured to receive a first reference voltage, and an output terminal configured to generate a first timer expired signal upon expiration of a first duration determined based on the first capacitance, the first current source and the first reference voltage; a second timer including a second capacitive element with a second capacitance, a second timing switching coupled in parallel with the second capacitive element; a second current source coupled in series with the second capacitive element and configured to source or sink a second current to or from the second capacitive element, and a second comparator with a first input terminal coupled to the second capacitive element, a second input terminal configured to receive a second reference voltage, and an output terminal configured to generate a second timer expired signal upon expiration of a second duration determined based on the second capacitance, the second current source and the second reference voltage; a logic gate coupled to outputs of the first and second comparators, and configured to generate an expiration signal based on expiration of both the first and second durations; and a control logic unit, coupled between the logic gate and a control terminal of the first switch, configured to switch the first switch from the second state to the first state based on the expiration signal.

BRIEF DESCRIPTION OF THE DRAWINGS

FIG. 1 is a schematic block diagram of a DC-DC converter system in accordance with a first implementation of the present disclosure;

FIGS. 2A-2D show schematic circuit diagrams of a timer unit of the DC-DC converter system of FIG. 1;

FIG. 9 is a schematic block diagram of a DC-DC converter system in accordance with a fifth implementation of the present disclosure;

FIG. 10 is a schematic circuit diagrams of a timer unit of the DC-DC converter system of FIG. 9;

DETAILED DESCRIPTION

Figure 2A:
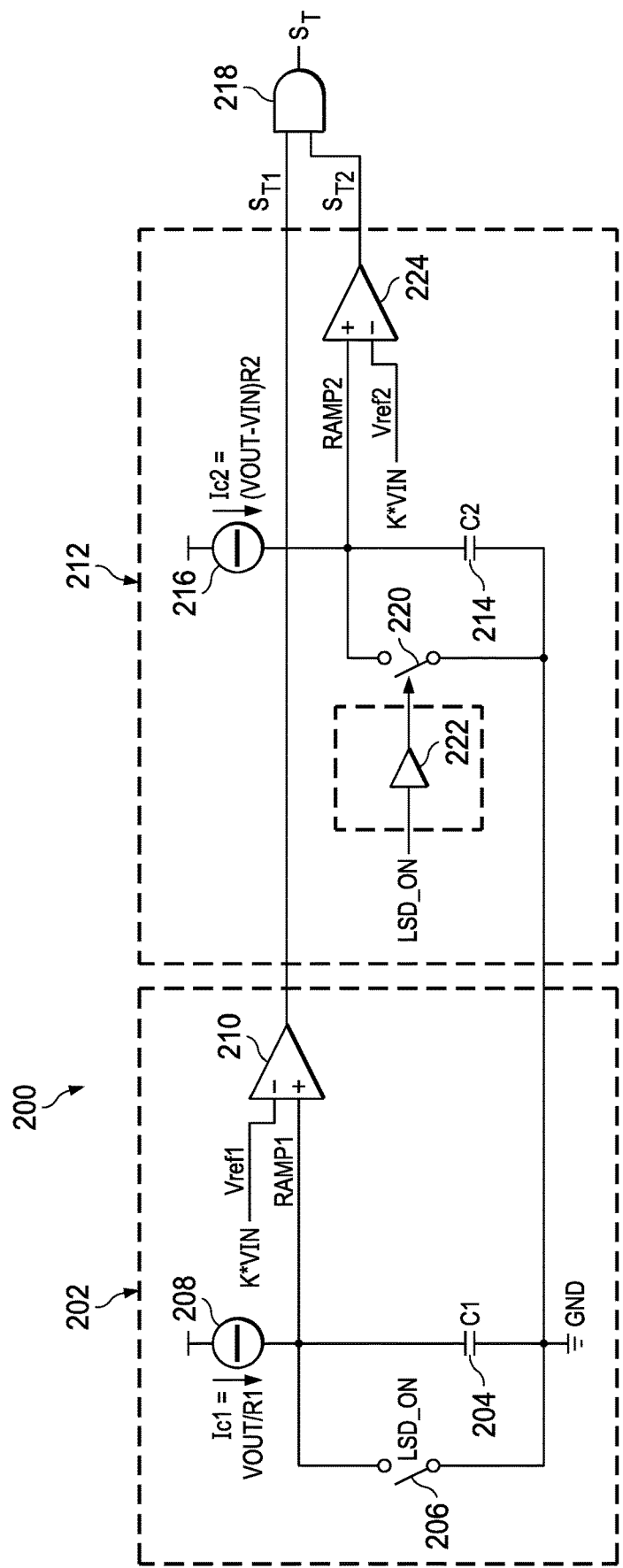

The present disclosure relates to current mode DC-DC converter systems.

Referring now to FIG. 1, a schematic block diagram of a DC-DC converter system 100 in accordance with a first implementation of the present disclosure is shown. More particularly, FIG. 1 shows an adaptive off-time current mode boost DC-DC converter system with peak current control topology.

The system 100 includes a first switch 102 coupled between a switch node SW and a voltage supply node, for example, a ground node GND, and a second switch 104 coupled between the switch node SW and an output node VOUT of the system 100, thereby allowing a current flowing from the switch node SW to the output node VOUT. The first and second switches 102 and 104, also named respectively as low side and high side switches, can be transistors, for example, N-channel MOSFETs that are respectively controlled by gate drive signals LSD_ON and HSD_ON to alternately operable between first and second states, e.g. on and off states, allowing a current to follow from the switch node SW towards the voltage supply node GND, and from the switch node SW towards the output node VOUT. In an alternate example, the second switch 104 can be replaced by a diode that allows current to flow from the switch node SW to the output node VOUT in a unidirectional manner. The system 100 also includes an input inductor 106 coupled between an input node VIN and the switch node SW, and an output capacitive element 108 coupled between the output node VOUT and the ground node GND.

The system 100 includes a controller 110 coupled to the first and second switches 102 and 104 to generate a PWM signal to alternately switch on and off the first and second switches 102 and 104 through a driver unit 112 which generates the gate drive signals LSD_ON and HSD_ON based on the PWM signal. In a preferred example, the driver unit 112 can be either a part of or separate from the controller 110.

The controller 110 includes a sensing unit 114 configured to generate a control signal Sc based on a difference between a sensing voltage Vs proportional to an inductor current IL through the inductor 106 and a control voltage Vc proportional to a difference between a reference voltage VREF and a feedback voltage VFB proportional to the output voltage VOUT, generated by an amplifier 116. In one example, the sensing unit 114 includes a comparator 118 configured to generate the control signal Sc to switch the first switch 102 from the on state to the off state if the sensing voltage Vs increases to the control voltage Vc. In one example, the sensing voltage Vs is proportional to a current Is flowing through the first switch 102 and obtained through a current-to-voltage (I/V) unit 120, for example, by sensing a voltage across a sensing resistor (not shown) coupled between the first switch 102 and the ground node GND.

The controller 110 includes a control logic 124 configured to switch the first switch 102 from the on state to the off state through the driver unit 112, based on the control signal Sc. However, a minimum duration of the on state, also known as a minimum on-time Ton_min, of the first switch is usually limited due to various factors of the DC-DC converter system 100, such as blanking time of inductor current IL sensing, delay caused by the comparator 118, the control logic 124 and/or the driver unit 112. The minimum on-time of the first switch 102 limits the range of a ratio of output voltage VOUT to the input voltage VIN.

The controller 110 also includes a timer unit 122 configured to determine a preferred duration of the off state, also known as an off-time Toff, of the first switch 102 based on a target switching frequency fsw of the DC-DC converter system 100, the minimum on-time Ton_min of the first switch, and the input and output voltages VIN and VOUT of the system 100.

The timer unit 122 is further configured to generate an expiration signal $S_T$ to switch the first switch 102 from the off state to the on state when the preferred off-time Toff expires. The control logic 124 is configured to generate the PWM signal based on the control signal Sc and the expiration signal $S_T$. For example, the control logic 124 can be an edge-triggered SR flip flop that asserts the PWM signal based on the expiration signal $S_T$ and de-asserts the PWM signal based on the control signal Sc.

FIG. 2A shows an example schematic circuit diagram of a timer unit 200, such as the timer unit 122 of the DC-DC converter system 100 of FIG. 1. The timer unit 200 includes a first timer 202 configured to generate a first timer expired signal $S_{T1}$ based on a first duration T1. In one example, the first duration T1 is a nominal duration of the second state, e.g. the off state, of the first switch 102 determined based on the target switching frequency fsw of the DC-DC converter system 100 and the input and output voltages VIN and VOUT, such that the DC-DC converter system operating at the target switching frequency fsw converts the input voltage VIN to the output voltage VOUT by keeping the first switch 102 at the off state for the nominal duration in each target switching cycle T. In the example of the adaptive off-time current mode boost DC-DC converter system with peak current control topology, the first duration T1 is determined in accordance with the equation below:

$$T1 = T \cdot \frac{VIN}{VOUT} \qquad (1)$$

where T is the target switching cycle, T=1/fsw.

In one example, the first timer 202 includes a first capacitive element 204 with a capacitance C1. The first capacitive element 204 is coupled in parallel with a first charging control switch 206 that is controlled by the gate drive signal LSD_ON, and in series with a first current source 208 configured to source a first charging current Ic1 to the first capacitive element 204. In the example of FIG. 2, Ic1=VOUT/R1. Charging the first capacitive element 204 is triggered upon the first switch 102 being switched from the on state to the off state. The first timer 202 includes a first comparator 210 with an inverting input coupled to a reference voltage generator shown in FIG. 2B to receive a reference voltage Vref1=K·VIN. The first capacitive element 204 is coupled between a non-inverting input of the first capacitive element 210 and the ground node GND. The first capacitive element 210 is configured to generate a first timer expired signal $S_{T1}$ when a voltage across the first capacitive element 204 increased to the reference voltage K*VIN. Accordingly, the first duration T1 is determined by the first timer 202 in accordance with the equation below:

$$T1 = K \cdot R1 \cdot C1 \cdot \frac{VIN}{VOUT} \quad (2)$$

where K is a number greater than 0, K·R1 is resistance of a resistor 236 of a charging path of the first timer 202 shown in FIG. 2C, and K·R1·C1 is configured to be substantially equal to the target switching cycle T=1/fsw of the DC-DC converter system 100 within acceptable error range resulting from inherent errors of the first capacitive element 210 and the resistor 236. However, the first charging current Ic1 and the reference voltage Vref1 can be other values as long as meeting the equation below:

$$T1 = \frac{Vref1}{Ic1} \cdot C1 = T \cdot \frac{VIN}{VOUT} \quad (3)$$

Figure 2D:
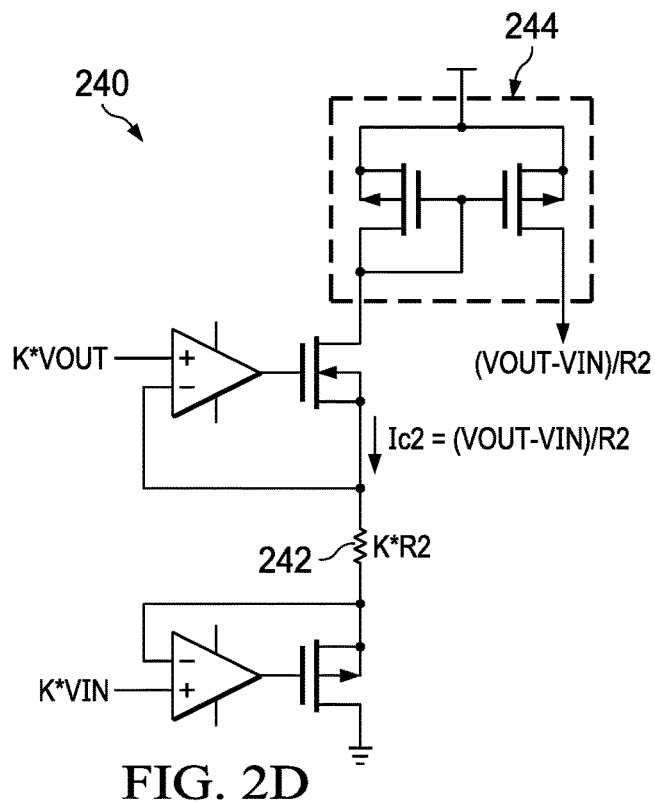

The timer unit 200 also includes a second timer 212 with a structure similar to that of the first timer 202 except that a second capacitive element 214 of the second timer 212 has a capacitance C2 and is charged by a second current source 216 with a second charging current Ic2, where Ic2=(VOUT−VIN)/R2. The second timer 212 is configured to be triggered substantially simultaneously with the first timer based on the gate drive signal LSD_ON, and to generate a second timer expired signal $S_{T2}$ based on a second duration T2 that is determined based on the minimum on-time Ton_min of the first switch 102 and the input and output voltages VIN and VOUT. The second duration T2 is provided in accordance with the equations below:

$$T2 = K \cdot R2 \cdot C2 \cdot \frac{VIN}{VOUT - VIN} \quad (4)$$

where K·R2 is resistance of a resistor 242 of a charging path of the second timer 212 shown in FIG. 2D, and K·R2·C2 is configured to be substantially equal to or slightly greater, e.g. 10 ns greater, than the minimum on-time Ton_min of the first switch 102.

In one example, the second timer 212 includes a second charging switch 220 configured to be switched off simultaneously with switching off the first charging switch 206, and K·R2·C2 is configured to be substantially equal to the minimum on-time Ton_min of the first switch 102, such that the second duration equals an off-time of the first switch 102 determined under the condition that the on-time of the first switch 102 is the minimum on-time Ton_min.

In another example, the second timer 212 includes a second charging switch 220 configured to be switched off simultaneously with switching off the first charging switch 206, and K·R2·C2 is configured to be slightly, e.g. 10 ns, greater, than the minimum on-time Ton_min of the first switch 102 to ensure the second duration longer than an off-time of the first switch 102 determined under the condition that the on-time of the first switch 102 is the minimum on-time Ton_min.

In yet another example, K·R2·C2 is configured to be substantially equal to the minimum on-time Ton_min of the first switch 102, and the second timer 212 further includes a delay unit 222 such that the second charging switch 220 is configured to be switched off slightly later, e.g. 50 ns or more, than switching off the first charging switch 206 to ensure the second duration longer than an off-time of the first switch 102 determined under the condition that the on-time of the first switch 102 is the minimum on-time Ton_min.

In one example, the second timer 212 further includes a second comparator 224 with an inverting input coupled to another reference voltage generator to receive another reference voltage Vref2. The second charging current Ic2 and the reference voltage Vref2 can be other values as long as meeting the equation below:

$$T2 = \frac{Vref2}{Ic2} \cdot C1 \geq Ton\_min \cdot \frac{VIN}{VOUT - VIN} \quad (5)$$

The timer unit 200 also includes a logic gate 218 configured to generate the expiration signal $S_T$ upon both the first and second timer expired signals $S_{T1}$ and $S_{T2}$ being asserted. In one example, when VOUT/(R1·C1)>(VOUT−VIN)/(R2·C2), the second duration T2 is smaller than the first duration T1, the preferred duration of the off state of the first switch 102 is determined by the first duration T1, which is the nominal duration of the off state of the first switch 102 determined based on the target switching frequency fsw and the input and output voltages of the system 100. In another example, when VOUT/(R1·C1)<(VOUT−VIN)/(R2·C2), the preferred duration of the off state of the first switch 102 is determined by the second duration T2, and the duration of the on state of the first switch 102 is regulated at (VOUT−VIN)/VIN*Toff=K*R2*C2, which is substantially equal to or greater than the minimum on-time Ton_min of the first switch 102, therefore the inductor current IL can still be regulated based on the sensing voltage Vs. In such situation, an actual switching cycle of the DC-DC converter system 100 is configured to be K·R2·C2·VOUT/(VOUT−VIN), with is greater than the target switching cycle of the DC-DC converter system 100.

FIG. 2B shows an example schematic circuit diagram of the reference voltage generator 226 that provides the reference voltage K·VIN. In one example, the reference voltage generator 226 includes a voltage divider 228 generating the reference voltage K·VIN proportional to the input voltage VIN.

FIG. 2C shows an example schematic circuit diagram of a current source 230, for example, the first current source 208 of the timer unit 200 of FIG. 2. The first current source 230 includes an error amplifier 232 having an output terminal coupled to a gate node of a transistor 234, a non-inverting input terminal configured to receive a reference voltage K·VOUT which can be provided in a similar manner as the reference voltage generator 220 shown in FIG. 2B, and an inverting input terminal coupled to a source node of the transistor 234. The first current source 230 also includes the resistor 236 coupled between the source node of the transistor 234 and the ground node GND and having a resistance of K·R1, and a current mirror 238 coupled to a drain node of the transistor 234 and configured to mirror a current flowing through the resistor 236, which is provided as the first charging current Ic1=VOUT/R1.

FIG. 2D shows an example schematic circuit diagram of another current source 240, for example, the second current source 216 of the timer unit 200 of FIG. 2. The second current source 240 has a structure similar to that of the first current source 230 except that a voltage difference across the resistor 242 is configured to be VOUT−VIN. The current mirror 244 is configured to mirror a current flowing through the resistor 242, which is provided as the second charging current Ic2=(VOUT−VIN)/R2.

Referring back to FIG. 1, the control logic unit 124 is configured to switch the first switch 102 from the off state to the on state based on the expiration signal $S_T$. Therefore, the duration of the off state, i.e., the off time Toff, of the first switch 102 is configured to be a greater one between the first and second duration T1 and T2.

In a conventional adaptive off-time current mode boost DC-DC converter system, the off-time Toff of the first switch, e.g. the low side switch, is configured to be a nominal off-time Toff' determined in accordance with the equation below:

$$Toff'=T \cdot VIN/VOUT \qquad (6)$$

Due to the limit of the minimum on-time Ton_min of the system, an on duty cycle range of the system is limited between Ton_min/T and 1, and thus a ratio of VOUT to VIN range is limited between T/(T−Ton_min) and ∞. Similarly, operation ranges of other conventional adaptive on-time/off-time current mode DC-DC converter systems with other topologies are also limited by the nominal off-time and minimum on-time of the system, or a nominal on-time and a minimum-off time of the system. Table 1 lists the operation ranges of conventional adaptive on-time/off-time current mode DC-DC converter systems with different topologies.

of VOUT to VIN is less than T/(T−Ton_min), the range of on duty cycle can be extended between 0 and 1, and the range of VOUT/VIN can be extended between 1 and ∞.

Figure 3:
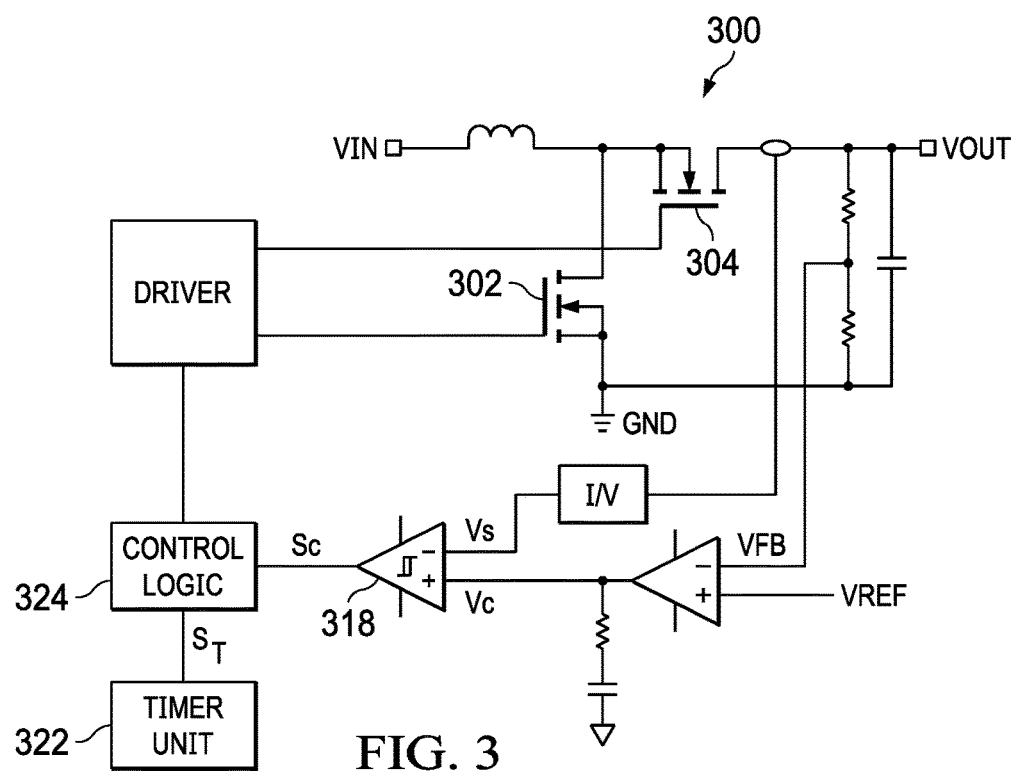
FIG. 3 is a schematic block diagram of a DC-DC converter system in accordance with a second implementation of the present disclosure.

FIG. 3 shows a schematic block diagram of a DC-DC converter system 300 in accordance with a second implementation of the present disclosure. More particularly, FIG. 3 shows an adaptive on-time current mode boost DC-DC converter system with valley current control topology.

The DC-DC converter system 300 is substantially similar to the DC-DC converter system 100 of FIG. 1 except that the sensing voltage Vs is generated proportional to a current flowing through the second switch 304, i.e. the high side switch, the comparator 318 is configured to generate the control signal Sc when the sensing voltage Vs decreases to the control voltage Vc, and the control logic 324 is configured to switch on the first switch 302 based on the control signal Sc and to switch off the first switch 302 based on the expiration signal $S_T$ generated by the timer unit 322.

Figure 4:
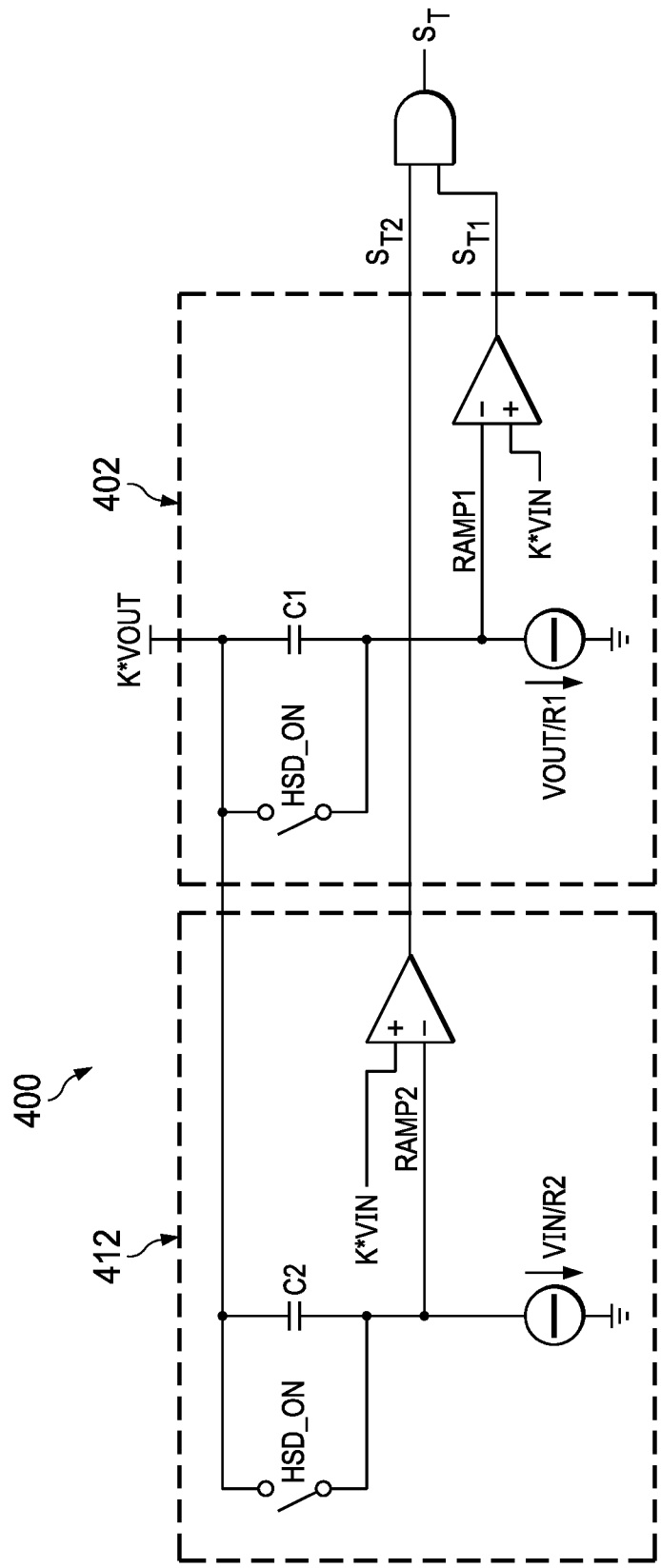
FIG. 4 is a schematic circuit diagrams of a timer unit of the DC-DC converter system of FIG. 3.

FIG. 4 shows an example schematic circuit diagram of a timer unit 400, such as the timer unit 322 of the DC-DC converter system 300 of FIG. 3. The timer unit 400 includes a first timer 402 configured to generate a first timer expired signal $S_{T1}$ based on a first duration T1. In one example, the first duration T1 is a nominal duration of the on state, i.e. a nominal on-time Ton, of the first switch 302 determined based on a target switching frequency fsw of the DC-DC converter system 300 and input and output voltages VIN and VOUT in accordance with the equation below:

$$T1 = T \cdot \frac{VOUT - VIN}{VOUT} \qquad (6)$$

where T is the target switching cycle of the system 300, T=1/fsw.

The first timer 402 is configured to determine the first duration T1, i.e., the nominal on-time of the first switch 302, in accordance with the equation below:

TABLE 1

Operation ranges of conventional adaptive on-time/off-time current mode DC-DC converter systems

| Buck/Boost | Topology | Ton and Toff | On Duty Cycle Range | VOUT/VIN range |
|---|---|---|---|---|
| Boost | Peak Current + adaptive Toff | Current Regulated, Ton ≥ Ton_min Toff = T*VIN/VOUT | (Ton_min/T,1) | (T/(T − Ton_min), ∞) |
|  | Valley current + adaptive Ton | Ton = T* (VOUT − VIN)/VOUT Current Regulated, Toff ≥ Toff_min | (0, 1 − Toff_min/T) | (1, T/Toff_min) |
| Buck | Peak Current + adaptive Toff | Current Regulated, Ton ≥ Ton_min Toff = T* (VIN − VOUT)/VIN | (Ton_min/T,1) | (Ton_min/T, 1) |
|  | Valley current + adaptive Ton | Ton = T*VOUT/VIN Current Regulated, Toff ≥ Toff_min | (0, 1 − Toff_min/T) | (0, 1 − Toff_min/T) |

In the present disclosure, the proposed adaptive off-time current mode boost DC-DC converter system 100 dynamically extends the off-time Toff of the first switch 102 when the off-time determined based on the minimum on-time Ton_min and the input and output voltages VIN and VOUT is greater than the nominal off-time of the DC-DC converter system. As the off-time of the first switch 102 can be extended to Ton_min·VIN/(VOUT−VIN) when a target ratio $$T1 = K \cdot R1 \cdot C1 \cdot \frac{VOUT - VIN}{VOUT} \qquad (7)$$

where K·R1·C1 is configured to be substantially equal to a target switching cycle T=1/fsw of the DC-DC converter system 300.

The timer unit 400 also includes a second timer 412 with a structure similar to that of the first timer 402 except that the second timer 412 is configured to generate a second timer expired signal $S_{T2}$ based on a second duration T2 provided in accordance with the equations below:

$$T2 = K \cdot R2 \cdot C2 \cdot \frac{VOUT - VIN}{VIN} \qquad (8)$$

where K·R2·C2 is configured to be substantially equal to or slightly greater, e.g. 10 ns greater, than a minimum duration of the off state, i.e., the minimum off-time Toff_min, of the first switch 302.

The first and second timer 402 and 412 are configured to start timing upon the second switch 304 being switched from the on state to the off state, i.e, when the first switch 302 is switched from the off state to the on state. Similar to the timer unit 200 of FIG. 2, the timer unit 400 is configured to generate an expiration signal $S_T$ upon both of the first and second timer expired signals $S_{T2}$ and $S_{T2}$ being asserted.

Similar to the DC-DC converter system 100 of FIG. 1, as the on-time of the first switch 302 can be extended to Toff_min·(VOUT−VIN)/VIN when a target ratio of VOUT to VIN is greater than T/Toff_min, the range of on duty cycle can be extended between 0 and 1, and the range of VOUT/VIN can be extended between 1 and ∞.

Figure 5:
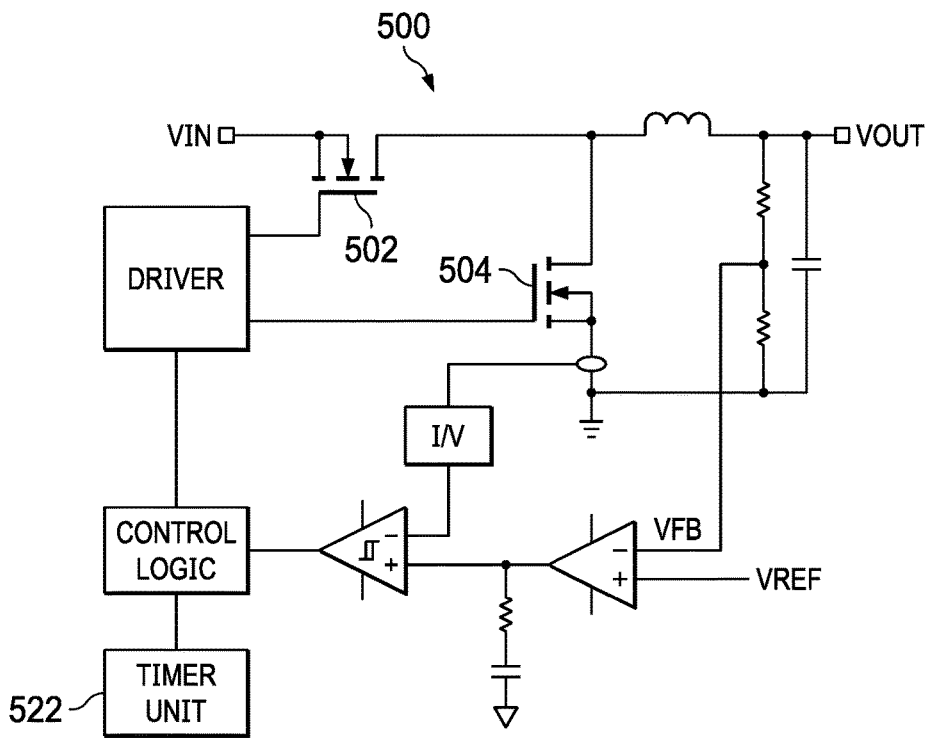
FIG. 5 is a schematic block diagram of a DC-DC converter system in accordance with a third implementation of the present disclosure.
Figure 6:
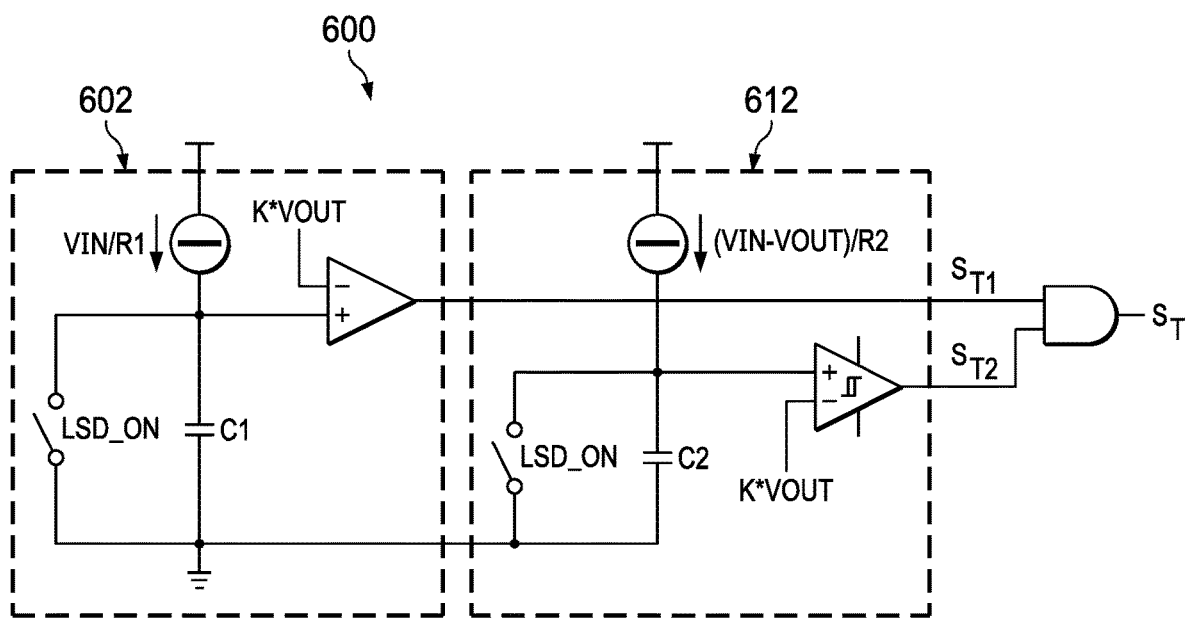
FIG. 6 is a schematic circuit diagrams of a timer unit of the DC-DC converter system of FIG. 5.

FIG. 5 in combination with FIG. 6 shows a schematic block diagram of a DC-DC converter system 500 in accordance with a third implementation of the present disclosure. More particularly, FIG. 5 shows an adaptive on-time current mode buck DC-DC converter system with valley current control topology. Similar to the adaptive on-time current mode boost DC-DC converter system 300 shown in FIG. 3 in combination with the timer unit 400 of FIG. 4, the DC-DC converter system 500 is configured to switch off the first switch 502, i.e. the high side switch, based on an expiration signal $S_T$ generated by the timer unit 522. The timer unit 522, shown as the timer unit 600 of FIG. 6 in more detail, is configured to generate the expiration signal $S_T$ to switch off the first switch 502 upon both of the first and second duration T1 and T2 respectively determined by the first and second timers expire. The first duration T1 is determined based on a nominal duration of the on state, e.g. a nominal on-time Ton, of the first switch 602 determined based on the switching frequency fsw and the input and output voltages VIN and VOUT of the DC-DC converter system 500, and the second duration T2 is determined based on the input and output voltages VIN and VOUT and a predetermined duration substantially equal to greater than the minimum duration of the off state, also known as minimum off-time Toff_min, of the first switch 502. Similar to the DC-DC converter system 300 of FIG. 3, as the duration of the on state, i.e., the on-time, of the first switch 502 can be extended to Toff_min·VOUT/(VIN−VOUT) when a target ratio of VOUT to VIN is greater than 1-Toff_min/T, the range of on duty cycle can be extended between 0 and 1, and the range of VOUT/VIN can be extended between 0 and 1.

Figure 7:
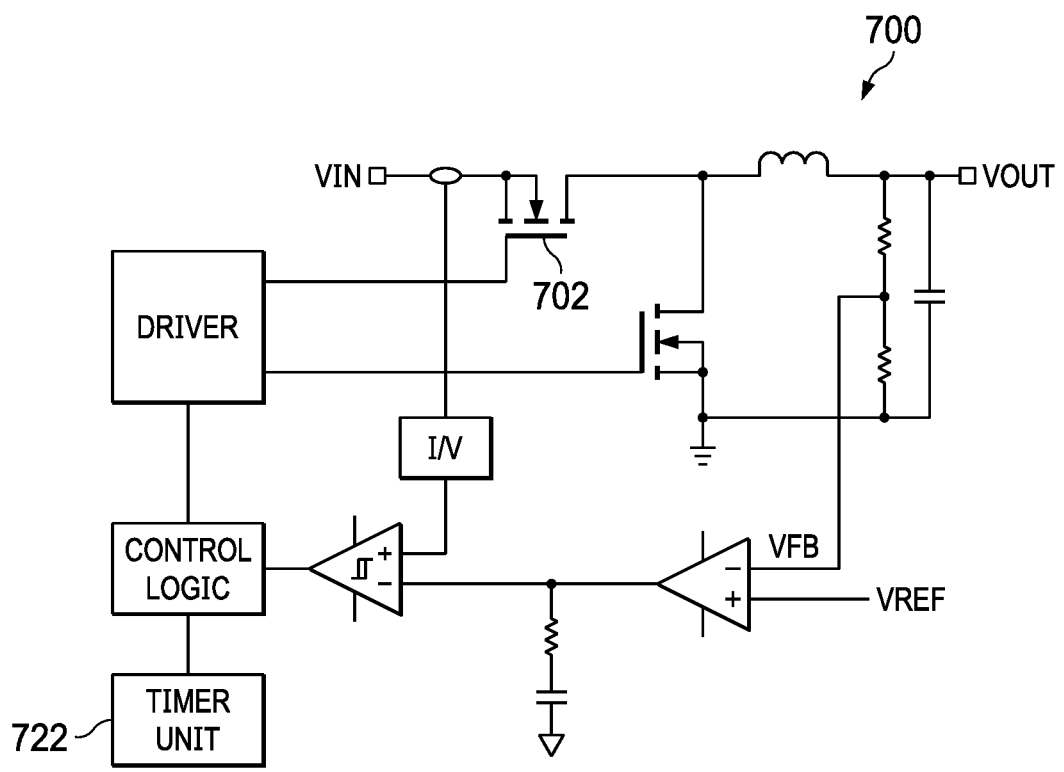
FIG. 7 is a schematic block diagram of a DC-DC converter system in accordance with a fourth implementation of the present disclosure.
Figure 8:
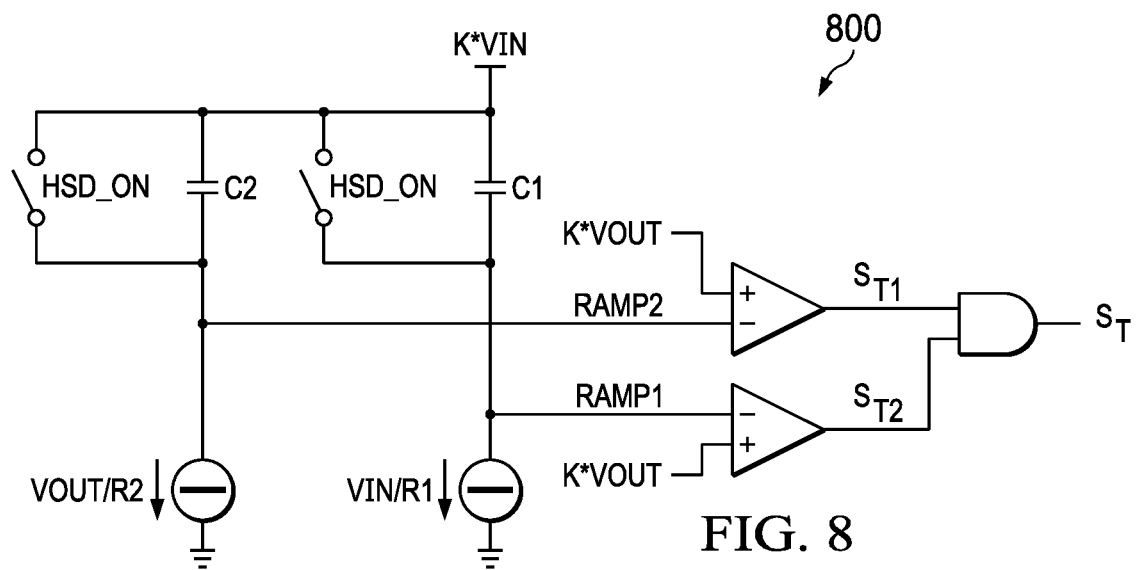
FIG. 8 is a schematic circuit diagrams of a timer unit of the DC-DC converter system of FIG. 7.

FIG. 7 in combination with FIG. 8 shows a schematic block diagram of a DC-DC converter system 700 in accordance with a fourth implementation of the present disclosure. More particularly, FIG. 7 shows an adaptive off-time current mode buck DC-DC converter system with peak current control topology. Similar to the adaptive on-time current mode buck DC-DC converter system 500 shown in FIG. 5 in combination with the timer unit 600 of FIG. 6, the DC-DC converter system 700 is configured to switch on the first switch 702, i.e. the high side switch, based on the expiration signal $S_T$ generated by the timer unit 722. The timer unit 722, shown as the timer unit 800 of FIG. 8 in more detail, is configured to generate the expiration signal $S_T$ to switch on the first switch 702 when both of the first and second duration T1 and T2 respectively determined by the first and second timers expire. The first duration T1 is determined based on a nominal duration of the off state, i.e. a nominal off-time, of the first switch 702 which is determined based on the switching frequency fsw and the input and output voltages VIN and VOUT of the DC-DC converter system 700, and the second duration T2 is determined based on the input and output voltages VIN and VOUT and a predetermined duration substantially equal to greater than the minimum on-time Ton_min of the first switch 702. Similar as the DC-DC converter system 500 of FIG. 5, as the off-time of the first switch 702 can be extended to Ton_min·(VIN-VOUT)/VOUT when a target ratio of VOUT to VIN is less than Ton_min/T, the range of on duty cycle can be extended between 0 and 1, and the range of VOUT/VIN can be extended between 0 and 1.

Table 2 lists the operation ranges of adaptive on-time/off-time current mode DC-DC converter systems with different topologies in accordance with the first to fourth implementations of the present disclosure.

TABLE 2

Operation ranges of adaptive on-time/off-time current mode DC-DC converter systems in accordance with implementations of the present disclosure

| Buck/Boost | Topology | Ton and Toff | On Duty Cycle Range | VOUT/VIN range |
|---|---|---|---|---|
| Boost | Peak Current + adaptive Toff | Current Regulated, Ton ≥ Ton_min Toff = max{T*VIN/VOUT, Ton_min*VIN/(VOUT − VIN)} | (0, 1) | (1, ∞) |
| | Valley current + adaptive Ton | Ton = max{T* (VOUT − VIN)/VOUT, Toff_min* (VOUT − VIN)/VIN} Current Regulated, Toff ≥ Toff_min | (0, 1) | (1, ∞) |
| Buck | Peak Current + adaptive Toff | Current Regulated, Ton ≥ Ton min Toff = max{T*(VIN − VOUT)/VIN, Ton_min* (VIN − VOUT)/VOUT} | (0,1) | (0, 1) |
| | Valley current + adaptive Ton | Ton = max{T*VOUT/VIN, Toff_min*VOUT/(VIN − VOUT)} Current Regulated, Toff ≥ Toff_min | (0, 1) | (0, 1) |

Referring to FIG. 9, a schematic block diagram of a DC-DC converter system 900 in accordance with a fifth implementation of the present disclosure is shown. More particularly, FIG. 9 shows a fixed frequency current mode boost DC-DC converter system with peak current control topology. The DC-DC converter system 900 is substantially similar to the DC-DC converter system 100 of FIG. 1 except that the sensing voltage Vs provided to the comparator 918 is proportional to a combination of the current flowing through the first switch 902 and a slope compensation signal, and the control logic 924 is configured to switch on the first switch 902 based on a clock signal CLK generated by the timer unit 922, for example, a rising edge of the clock signal CLK.

FIG. 10 shows an example schematic circuit diagram of a timer unit 1000, such as the timer unit 922 of the DC-DC converter system 900 of FIG. 9. The timer unit 1000 is substantially similar to the timer unit 200 of FIG. 2, except that the timer unit 922 further includes a one-shot signal generator 1022 coupled to the switches 1006 and 1020 to provide a one-shot signal RST based on the clock signal CLK, such that the first and second timers 1002 and 1012 start timing upon the first switch 902 being switched from the off state to the on state. The first timer 1002 is configured to generate a first timer expired signal $S_{T1}$ based on a first duration T1. In one example, the first duration T1 is a target switching cycle T=1/fsw, where fsw is a target switching frequency of the DC-DC converter system 900. The first duration T1 is provided in accordance with the equations below:

$$T1 = K \cdot R1 \cdot C1 \quad (9)$$

where $K \cdot R1 \cdot C1$ is configured to be substantially equal to the target switching cycle T=1/fsw of the DC-DC converter system 900.

The timer unit 1000 also includes a second timer 1012 configured to generate a second timer expired signal $S_{T2}$ based on a second duration T2 that is determined based on a minimum duration of the on state, i.e., a minimum on-time Ton_min, of the first switch 902 and the input and output voltages VIN and VOUT. In one example, the second duration T2 is determined based on the input and output voltages VIN and VOUT, and a predetermined duration substantially equal to greater than the minimum on-time Ton_min of the first switch 902. The second duration T2 is provided in accordance with the equations below:

$$T2 = K \cdot R2 \cdot C2 \cdot \frac{VOUT}{VOUT - VIN} \quad (10)$$

where $K \cdot R2 \cdot C2$ is configured to be substantially equal to or slightly greater, e.g. 10 ns greater, than the minimum on-time Ton_min of the first switch 902.

The timer unit 1000 further includes a gate logic 1018 configured to generate, for example, a rising edge, of the clock signal CLK based on the first and second timer expired signals $S_{T2}$ and $S_{T2}$, wherein the cycle of the clock signal CLK is configured to be the larger one of the first and second duration T1 and T2.

In a conventional fixed frequency peak current control mode boost DC-DC converter system, a cycle of a clock signal CLK that periodically switches the first switch from a second state, e.g. the off state, to a first state, e.g. the on state, is fixed by the target switching frequency fsw of the conventional system.

Due to the minimum on-time Ton_min of the conventional system, the on duty cycle range of the system is limited between Ton_min/T and 1-Toff_min/T, and thus a range of a ratio of VOUT to VIN is limited between T/(T−Ton_min) and T/Toff_min. Similarly, operation ranges of other conventional fixed frequency current mode DC-DC converter systems with other topologies are also limited by the target switching cycle and minimum on or off time of the first switch of the system. Table 3 lists the operation ranges of conventional fixed frequency current mode DC-DC converter systems with different topologies.

TABLE 3

Operation ranges of conventional fixed frequency current mode DC-DC converter systems

| Buck/Boost | Topology | Ton and Toff | On Duty Cycle Range | VOUT/VIN range |
|---|---|---|---|---|
| Boost | Fixed frequency + Peak Current | Current Regulated, Ton ≥ Ton_min Fixed period T | (Ton_min/T, 1 − Toff_min/T) | (T/(T − Ton_min), T/Toff_min) |
| | Fixed frequency + Valley Current | Current Regulated, Toff ≥ Toff_min Fixed Period T | (Ton_min/T, 1 − Toff_min/T) | (T/(T − Ton_min), T/Toff_min) |
| Buck | Fixed frequency + Peak Current | Current Regulated, Ton ≥ Ton_min Fixed period T | (Ton_min/T, 1 − Toff_min/T) | (Ton_min/T, 1 − Toff_min/T) |
| | Fixed frequency + Valley Current | Current Regulated, Toff ≥ Toff_min Fixed Period T | (Ton_min/T, 1 − Toff_min/T) | (Ton_min/T, 1 − Toff_min/T) |

In the present disclosure, the proposed fixed frequency current mode boost DC-DC converter system 900 dynamically extends the switching cycle when a switching cycle determined based on the minimum on-time Ton_min and the input and output voltages VIN and VOUT is greater than the target switching cycle of the DC-DC converter system. As the switching cycle can be extended to Ton_min·VOUT/(VOUT−VIN) when a target ratio of VOUT to VIN is less than T/(T−Ton_min), the range of on duty cycle can be extended between 0 and 1-Toff_min/T, and the range of VOUT/VIN can be extended between 1 and T/Toff_min.

Figure 11:
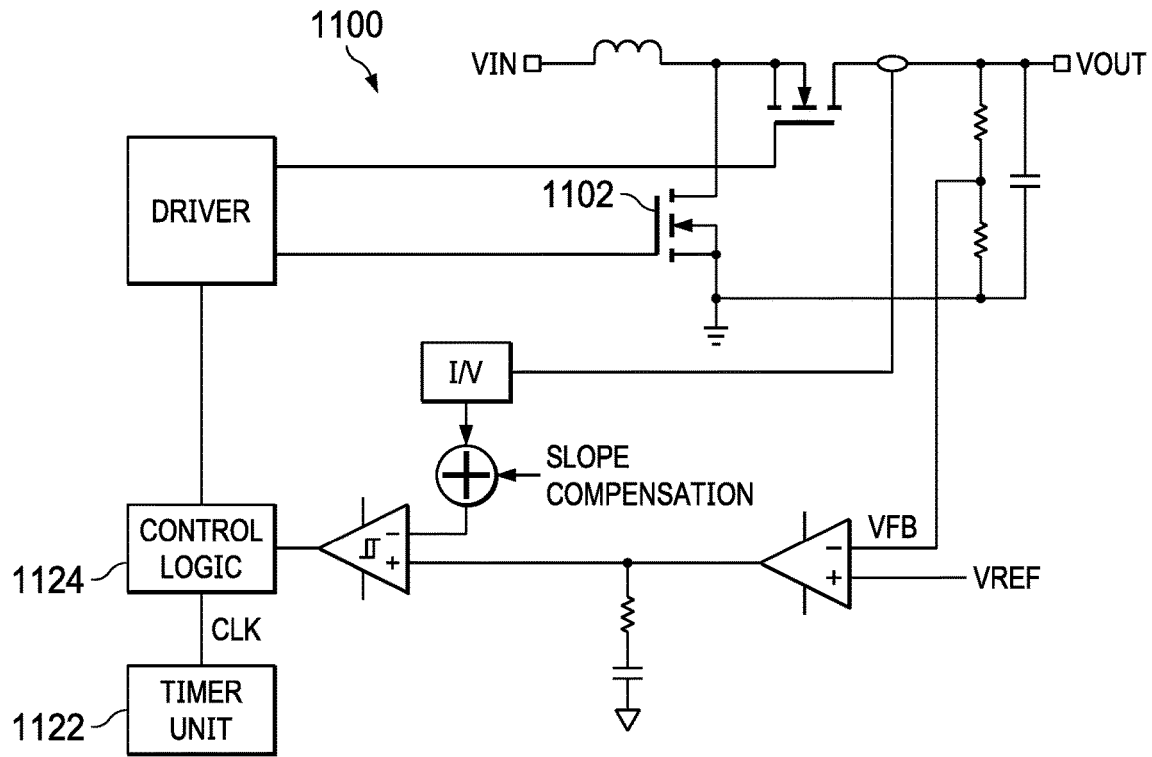
FIG. 11 is a schematic block diagram of a DC-DC converter system in accordance with a sixth implementation of the present disclosure.
Figure 12:
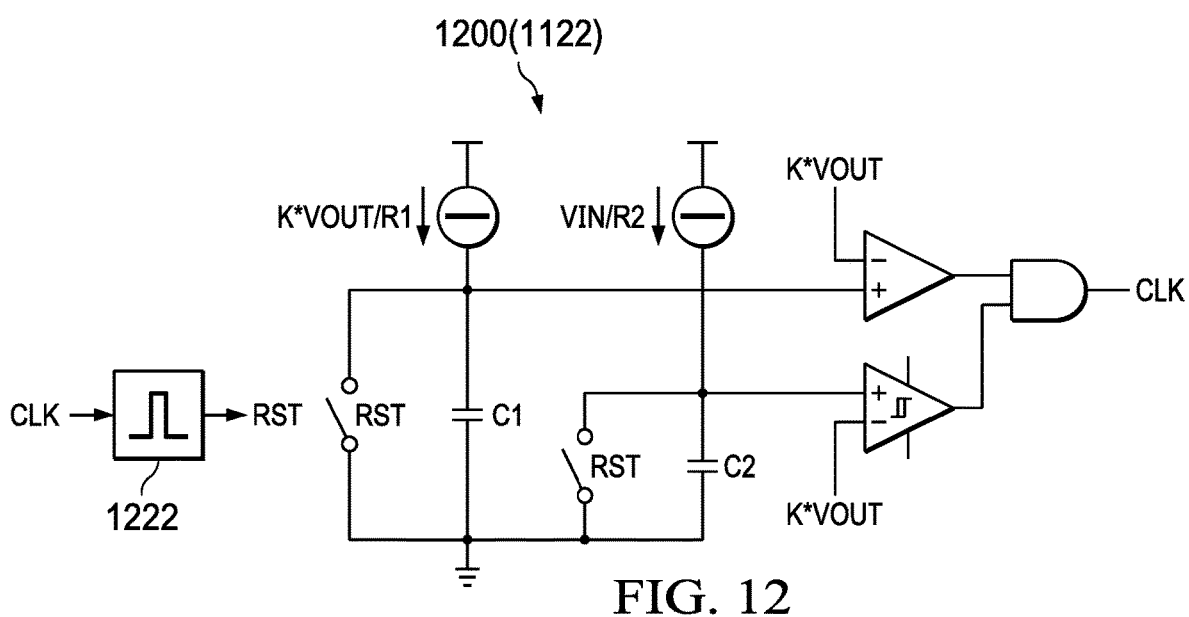
FIG. 12 is a schematic circuit diagrams of a timer unit of the DC-DC converter system of FIG. 11.

FIG. 11 in combination with FIG. 12 shows a schematic block diagram of a DC-DC converter system 1100 in accordance with a sixth implementation of the present disclosure. More particularly, FIG. 11 shows a fixed current mode boost DC-DC converter system with valley current control topology. Similar to the timer unit 1000 of FIG. 10, the timer unit 1200 is configured to generate a clock signal CLK with a cycle determined based on a larger one between the target switching cycle of the DC-DC converter system 1100 and an adjusted cycle determined based on the input and output voltages VIN and VOUT and a predetermined duration substantially equal to greater than the minimum off time Toff_min of the first switch 1102 of the DC-DC converter system 1100. The control logic 1124 is configured to switch off the first switch 1102 upon, for example, a rising edge, of the clock signal CLK.

Figure 13:
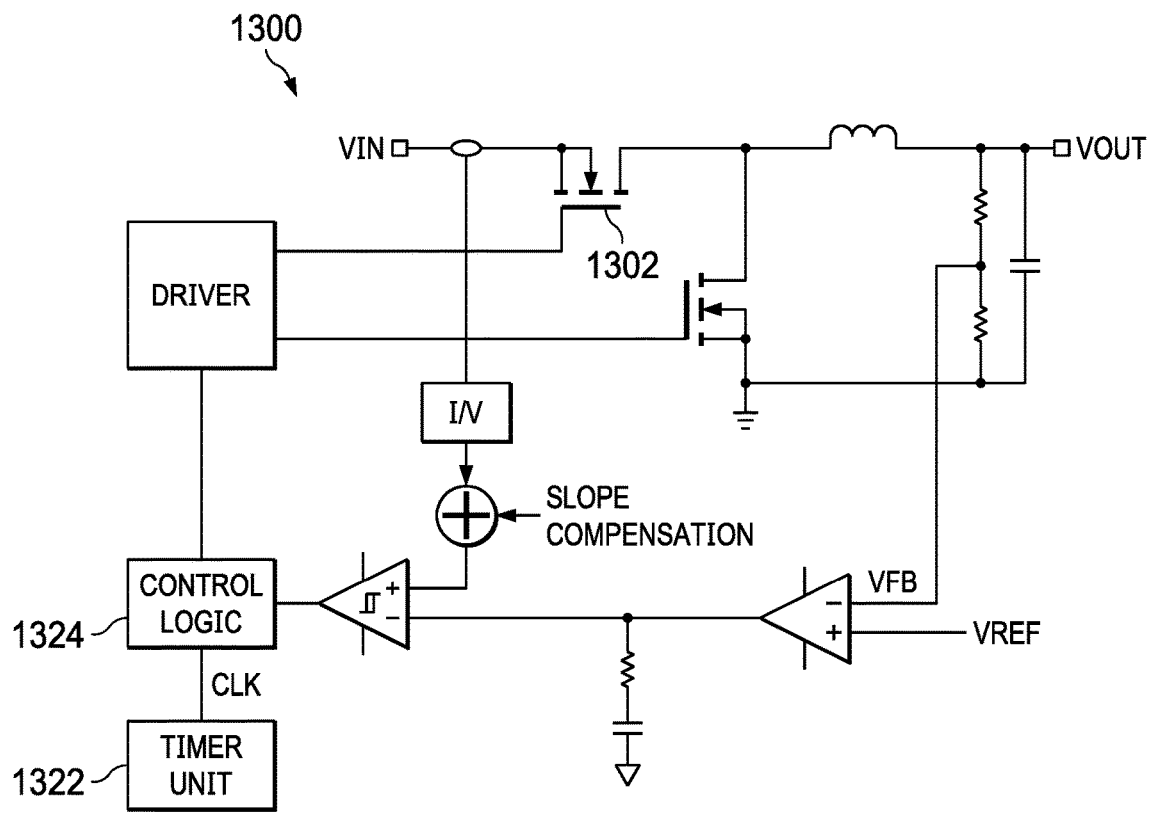
FIG. 13 is a schematic block diagram of a DC-DC converter system in accordance with a seventh implementation of the present disclosure.
Figure 14:
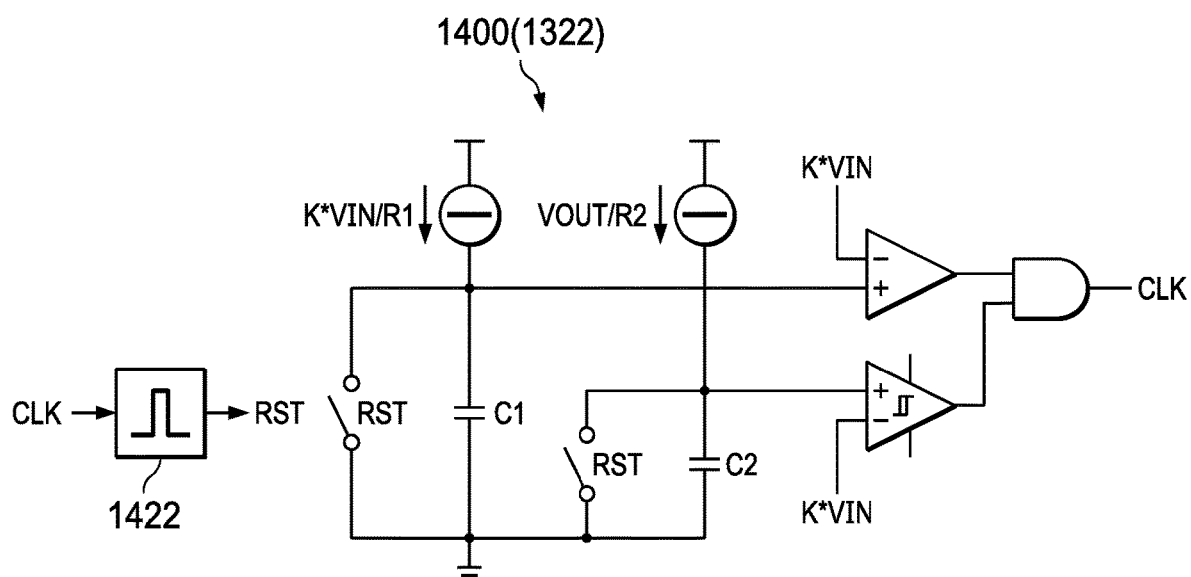
FIG. 14 is a schematic circuit diagrams of a timer unit of the DC-DC converter system of FIG. 13.

FIG. 13 in combination with FIG. 14 shows a schematic block diagram of a DC-DC converter system 1300 in accordance with a seventh implementation of the present disclosure. More particularly, FIG. 13 shows a fixed current mode buck DC-DC converter system with peak current control topology. Similar to the timer unit 1000 of FIG. 10, the timer unit 1400 is configured to generate a clock signal CLK with a cycle determined based on a larger one between the target switching cycle of the DC-DC converter system 1300 and an adjusted cycle determined based on the input and output voltages VIN and VOUT and a predetermined duration substantially equal to greater than the minimum on time Ton_min of the first switch 1302 of the DC-DC converter system 1300. The control logic 1324 is configured to switch on the first switch 1302 upon, for example, a rising edge, of the clock signal CLK.

Figure 15:
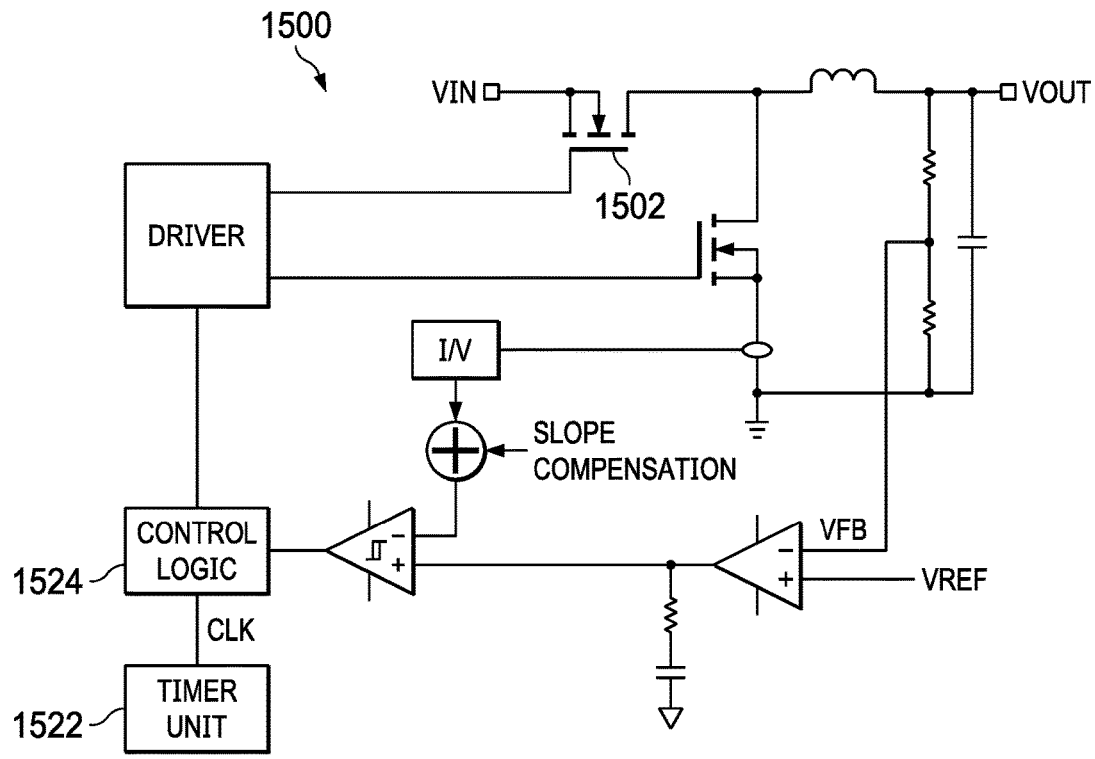
FIG. 15 is a schematic block diagram of a DC-DC converter system in accordance with an eighth implementation of the present disclosure.
Figure 16:
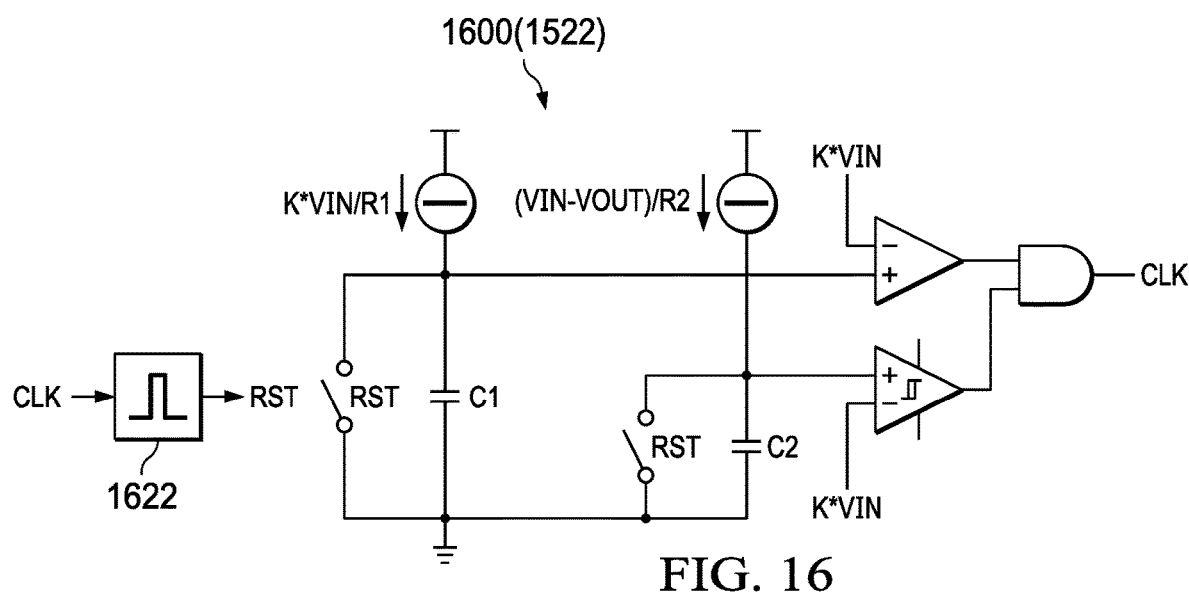
FIG. 16 is a schematic circuit diagrams of a timer unit of the DC-DC converter system of FIG. 15.

FIG. 15 in combination with FIG. 16 shows a schematic block diagram of a DC-DC converter system 1500 in accordance with an eighth implementation of the present disclosure. More particularly, FIG. 15 shows a fixed current mode buck DC-DC converter system with valley current control topology. Similar to the timer unit 1200 of FIG. 12, the timer unit 1200 is configured to generate a clock signal CLK with a cycle determined based on a larger one between the target switching cycle of the DC-DC converter system 1500 and an adjusted cycle determined based on the input and output voltages VIN and VOUT and a predetermined duration substantially equal to greater than the minimum off time Toff_min of the first switch 1502 of the DC-DC converter system 1500. The control logic 1524 is configured to switch off the first switch 1502 upon, for example, a rising edge, of the clock signal CLK.

Table 4 lists the operation ranges of fixed frequency current mode DC-DC converter systems with different topologies in accordance with the fifth to eighth implementations of the present disclosure.

TABLE 4

Operation ranges of fixed frequency current mode DC-DC converter systems in accordance with implementations of the present disclosure

| Buck/Boost | Topology | Ton and Toff | On Duty Cycle Range | VOUT/VIN range |
|---|---|---|---|---|
| Boost | Fixed frequency + Peak Current | Current Regulated, Ton ≥ Ton_min T_new = max{T, Ton_min*VOUT/(VOUT ≥ VIN)} | (0, 1 − Toff_min/T) | (1, T/Toff_min) |
|  | Fixed frequency + Valley Current | Current Regulated, Toff ≥ Toff_min T_new = max{T, Toff*VOUT/VIN} | (Ton_min/T, 1) | (T/(T − Ton_min), ∞) |
| Buck | Fixed frequency + Peak Current | Current Regulated, Ton ≥ Ton_min T_new = max{T, Ton_min*VIN/VOUT} | (0, 1 − Toff_min/T) | (0, 1 − Toff_min/T) |
|  | Fixed frequency + Valley Current | Current Regulated, Toff ≥ Toff_min T_new = max{T, Toff_min*VIN/(VIN − VOUT)} | (Ton_min/T, 1) | (Ton_min/T, 1) |

Figure 17:
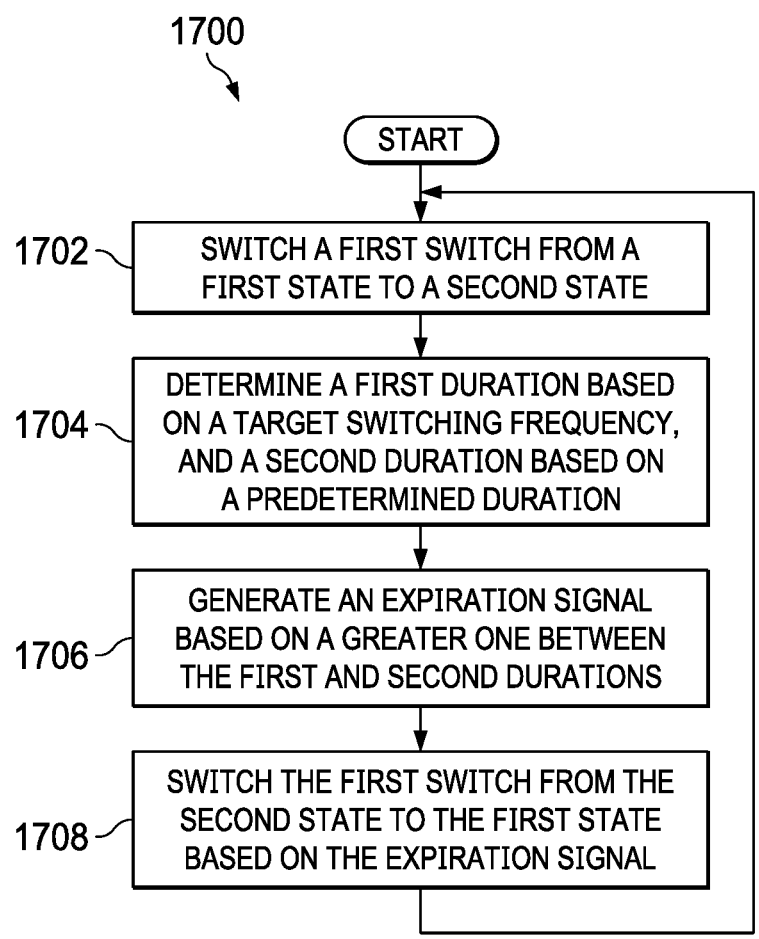
FIG. 17 is a flow chart of a method of operating a DC-DC converter system in accordance with an implementation of the present disclosure.

Referring to FIG. 17, a flow chart of a method 1700 for regulating a DC-DC converter system in accordance with an implementation of the present disclosure is shown. With reference to the DC-DC converter system 100 of FIG. 1, the DC-DC converter system includes the first switch 102 coupled between the switch node SW and a voltage supply node, for example, a ground node GND. The inductor 106 is coupled between the switch node SW and the voltage input node VIN, and second switch 104 is coupled between the switch node SW and the voltage output node VOUT. The first switch 102 is configured to periodically allow the inductor current IL to flow there through. Other topologies of current mode DC-DC converter systems with the same mechanism to sensing a load current and regulate the DC-DC converter system are possible as well, such as the DC-DC converter systems 300 to 1500 respectively shown in FIGS. 3-15.

Starting at step 1702, the control logic 124 generates a PWM signal to switch the first switch 102 from a first state, e.g. on state, to a second state, e.g. off state, through the driver unit 112.

At step 1704, the first timer 202 of the timer unit 122 starts timing a first duration T1, and substantially simultaneously, the second timer 212 of the timer unit 122 starts timing a second duration T2 that is determined based on input and output voltages VIN and VOUT of the DC-DC converter system 100 and a minimum duration of the first state of the first switch 102, i.e., the minimum on-time Ton_min, of the first switch 102.

In one example, for adaptive off-time/on-time current mode DC-DC converter systems such as the DC-DC converter systems 100 to 700 of FIGS. 1, 3, 5 and 7 with corresponding timer units 200 to 800 of FIGS. 2A, 4, 6 and 8, the first and second timers 202 and 212 are configured to start timing upon the first switch 102 being switched from the first state to the second state, the first duration T1 is a nominal duration of the second state of the first switch 102 determined based on a target switching frequency fsw of the DC-DC converter system and the input and output voltages, and the second duration T2 is an adjusted duration of the second state of the first switch determined based on the input and output voltages VIN and VOUT and a predetermined duration substantially equal to greater than a minimum duration of the first state of the first switch.

In the example with reference to the DC-DC converter system 100 of FIG. 1, the first duration T1 is a nominal duration of the off state, i.e., a nominal off time Toff, of the first switch 102, and provided in accordance with the equations below:

$$T1 = T \cdot VIN/VOUT \quad (11)$$

where T is a target switching cycle T=1/fsw of the DC-DC converter system 100, fsw is a target switching frequency of the DC-DC converter system 100.

The second duration T2 is an adjusted duration of the off state, i.e., an adjusted off-time, of the first switch 102 determined based on the input and output voltages VIN and VOUT and a predetermined duration Ton_min' substantially equal to or greater than a minimum duration of the on state, i.e., a minimum on-time Ton_min, of the first switch 102. The second duration T2 is provided in accordance with the equations below:

$$T2 = \text{Ton\_min}' \cdot \frac{VOUT}{VOUT - VIN} \quad (12)$$

where Ton_min' is the predetermined duration substantially equal to or slightly greater, e.g. 10 ns greater, than the minimum on-time Ton_min of the first switch 902.

In another example, for fixed frequency current mode DC-DC converter systems such as the DC-DC converter systems 900 of FIG. 9 with a timer unit 1000 of FIG. 10, the first and second timers start timing upon the first switch 902 being switched from the second state to the first state, e.g., for the DC-DC converter system 900, from the off state to the on state. The first duration T1 is the target switching cycle T of the DC-DC converter system 900. The second duration T2 is an adjusted switching cycle determined based on the input and output voltages VIN and VOUT and a predetermined duration Ton_min' substantially equal to or greater than the minimum on time Ton_min of the first switch 902. The second duration T2 is provided in accordance with the equations below:

$$T2 = \text{Ton\_min}' \cdot \frac{VIN}{VOUT - VIN} \quad (13)$$

where Ton_min' is the predetermined duration substantially equal to or slightly greater, e.g. 10 ns greater, than the minimum on-time Ton_min of the first switch 902.

At step 1706, the sensing unit 114 generates a control signal Sc to switch the first switch 102 from the first state, e.g. the on state, to the second state, e.g. the off state, based on a difference between a sensed voltage Vs proportional to the inductor current IL and a difference between a reference voltage VREF and a feedback voltage VFB proportional to the output voltage VOUT.

In one example, for DC-DC converter systems with a peak current control topology, such as the DC-DC converter systems 100, 700, 900 and 1300 respectively shown in FIGS. 1, 7, 9 and 13, switching the first switch from the first state to the second state comprises switching the first switch from the on state to the off state upon a current through the first switch increasing to a peak value determined based on the difference between the feedback voltage VFB of the output voltage VOUT and the reference voltage VREF and expiration of a minimum on-time of the first switch.

In another example, for DC-DC converter systems with a valley current control topology, such as the DC-DC converter systems 300, 500, 1100 and 1500 respectively shown in FIGS. 3, 5, 11 and 15, switching the first switch from the first state to the second state comprises switching the first switch from an off state to an on state upon a current through the second switch decreasing to a valley value determined based on a difference between the feedback voltage VFB of the output voltage VOUT and a reference voltage VREF and expiration of a minimum off-time of the first switch.

At step 1708, the timer unit 122 generates an expiration signal $S_T$ to switch the first switch 102 from the second state to the first state upon expiration of both the first and second timers.

The description of the preferred implementations of the present disclosure has been presented for purposes of illustration and description, but is not intended to be exhaustive or to limit the disclosure to the forms disclosed. Numerous modifications, changes, variations, substitutions, and equivalents will be apparent to those skilled in the art, without departing from the spirit and scope of the present disclosure, as described in the claims.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B by direct connection, or in a second example device A is coupled to device B through intervening component C if intervening component C does not alter the functional relationship between device A and device B such that device B is controlled by device A via the control signal generated by device A.

The invention claimed is:

1. A DC-DC converter system, comprising:
   a first switch configured to operate between first and second states; and
   a controller, coupled to the first switch, and configured to switch the first switch between the first and second states based on an input voltage and an output voltage of the DC-DC converter system, wherein the controller comprises:
   timer circuitry comprising:
      a first timer configured to determine a first duration based on a target switching frequency of the DC-DC converter system, in which the first duration is of the second state of the first switch or the first duration is a first switching cycle of the DC-DC converter system;
      a second timer configured to determine a second duration based on a third duration that is greater than or substantially equal to a minimum duration of the first state of the first switch multiplied by a ratio of the input voltage divided by a difference of the output voltage and the input voltage, in which the second duration is of the second state of the first switch or the second duration is a second switching cycle of the DC-DC converter system; and
      logic circuitry coupled to the first and second timers, the logic circuitry configured to generate an expiration signal responsive to expiration of both the first and second durations; and control logic configured to switch the first switch from the second state to the first state responsive to the expiration signal.

2. The DC-DC converter system of claim 1, wherein:
the first timer is configured to start timing responsive to the first switch being switched from the first state to the second state and generate a first timer expired signal when the first duration expires, wherein the first duration is of the second state of the first switch; and
the second timer is configured to start timing substantially simultaneously with the first timer and generate a second timer expired signal when the second duration expires, wherein the second duration is of the second state of the first switch, wherein the logic circuitry is configured to generate the expiration signal responsive to a later one of the first or second timer expired signals.

3. The DC-DC converter system of claim 2, wherein the controller is configured to:
switch the first switch from an on state to an off state responsive to a current through the first switch increasing to a peak value determined based on a difference between a feedback voltage of the output voltage and a reference voltage, and expiration of a minimum duration of the on state of the first switch; and
switch the first switch from the off state to the on state responsive to the expiration signal.

4. The DC-DC converter system of claim 2, further comprising a second switch coupled to the first switch, the second switch configured to operate between the first and second states alternately with the first switch, wherein the controller is configured to:
switch the first switch from an off state to an on state responsive to a current through the second switch decreasing to a valley value determined based on a difference between a feedback voltage of the output voltage and a reference voltage, and expiration of a minimum duration of the off state of the first switch; and
switch the first switch from the on state to the off state responsive to the expiration signal.

5. The DC-DC converter system of claim 1, wherein:
the first timer is configured to start timing responsive to the first switch being switched from the second state to the first state and generate a first timer expired signal when the first duration expires, wherein the first duration is the first switching cycle; and
the second timer is configured to start timing substantially simultaneously with the first timer and generate a second timer expired signal when the second duration expires, wherein the second duration is this second switching cycle, wherein the logic circuitry is configured to generate the expiration signal responsive to a later one of the first or second timer expired signals to switch the first switch from the second state to the first state.

6. The DC-DC converter system of claim 5, wherein the controller is configured to:
switch the first switch from an on state to an off state responsive to a combination of a current through the first switch and a slope compensation signal increasing to a peak value determined based on a difference between a feedback voltage of the output voltage and a reference voltage, and expiration of a minimum duration of the on state of the first switch; and
switch the first switch from the off state to the on state responsive to the expiration signal.

7. The DC-DC converter system of claim 5, further comprising a second switch coupled to the first switch, the second switch configured to operate between the first and second states alternately with the first switch, wherein the controller is configured to:
switch the first switch from an off state to an on state responsive to a combination of a current through the second switch and a slope compensation signal decreasing to a valley value determined based on a difference between a feedback voltage of the output voltage and a reference voltage, and expiration of a minimum duration of the off state of the first switch; and
switch the first switch from the on state to the off state responsive to the expiration signal.

8. The DC-DC converter system of claim 1, wherein:
the first timer comprises:
a first current source having a first terminal and a second terminal;
a first capacitive element having a respective first terminal coupled to the first terminal of the first current source, and having a respective second terminal;
a second switch having a respective first terminal coupled to the first terminals of the first capacitive element and the first current source, and having a respective second terminal coupled to the second terminal of the first capacitive element; and
a first comparator having a first input terminal coupled to the first terminals of the first capacitive element, the first current source, and the second switch, having a reference input terminal, and having an output terminal coupled to a respective first input terminal of the logic circuitry; and
the second timer comprises:
a second current source having a respective first terminal, and having a respective second terminal coupled to the second terminal of the first current source;
a second capacitive element having a respective first terminal coupled to the first terminal of the second current source, and having a respective second terminal;
a third switch having a respective first terminal coupled to the first terminals of the second capacitive element and the second current source, and having a respective second terminal coupled to the second terminal of the second capacitive element; and
a second comparator having a respective first input terminal coupled to the first terminals of the second capacitive element, the second current source, and the third switch, having a respective reference input terminal, and having a respective output terminal coupled to a respective second input terminal of the logic circuitry.

9. A controller comprising:
timer circuitry comprising:
a first timer configured to determine a first duration based on a target switching frequency of a DC-DC converter system, in which the first duration is of a second state of a first switch of the DC-DC converter system or the first duration is a first switching cycle of the DC-DC converter system;
a second timer configured to determine a second duration based on a third duration that is greater than or substantially equal to a minimum duration of a first state of the first switch multiplied by a ratio of an input voltage of the DC-DC converter system divided by a difference of an output voltage of the DC-DC converter system and the input voltage, in which the second duration is of the second state of the first switch or the second duration is a second switching cycle of the DC-DC converter; and logic circuitry coupled to the first and second timers and configured to generate an expiration signal responsive to expiration of both the first and second durations; and control logic configured to switch the first switch from the second state to the first state responsive to the expiration signal.

10. The controller of claim 9, wherein:

the first timer is configured to start timing responsive to the first switch being switched from the first state to the second state, and generate a first timer expired signal when the first duration expires, wherein the first duration is of the second state of the first switch; and the second timer is configured to start timing substantially simultaneously with the first timer and generate a second timer expired signal when the second duration expires, wherein the second duration is of the second state of the first switch, wherein the logic circuitry is configured to generate the expiration signal responsive to a later one of the first and second timer expired signals.

11. The controller of claim 10, wherein the controller is configured to:

switch the first switch from an on state to an off state responsive to a current through the first switch increasing to a peak value determined based on a difference between a feedback voltage of the output voltage and a reference voltage, and expiration of a minimum duration of the on state of the first switch; and switch the first switch from the off state to the on state responsive the expiration signal.

12. The controller of claim 10, further comprising a second switch coupled to the first switch, the second switch configured to operate between the first and second states alternately with the first switch, wherein the controller is configured to:

switch the first switch from an off state to an on state responsive to a current through the second switch decreasing to a valley value determined based on a difference between a feedback voltage of the output voltage and a reference voltage, and expiration of a minimum duration of the off state of the first switch; and switch the first switch from the on state to the off state responsive to the expiration signal.

13. The controller of claim 9, wherein:

the first timer is configured to start timing responsive to the first switch being switched from the second state to the first state and generate a first timer expired signal when the first duration expires, wherein the first duration is the first switching cycle; and the second timer is configured to start timing substantially simultaneously with the first timer and generate a second timer expired signal when the second duration expires, wherein the second duration is the second switching cycle, wherein the controller is configured to generate the expiration signal responsive to a later one of the first and second timer expired signals to switch the first switch from the second state to the first state.

14. The controller of claim 13, wherein the controller is configured to:

switch the first switch from an on state to an off state responsive to a combination of a current through the first switch and a slope compensation signal increasing to a peak value determined based on a difference between a feedback voltage of the output voltage and a reference voltage, and expiration of a minimum duration of the on state of the first switch; and switch the first switch from the off state to the on state responsive to the expiration signal.

15. The controller of claim 13, further comprising a second switch coupled to the first switch, the second switch configured to operate between the first and second states alternately with the first switch, wherein the controller is configured to:

switch the first switch from an off state to an on state responsive to a combination of a current through the second switch and a slope compensation signal decreasing to a valley value determined based on a difference between a feedback voltage of the output voltage and a reference voltage, and expiration of a minimum duration of the off state of the first switch; and switch the first switch from the on state to the off state responsive to the expiration signal.

16. The controller of claim 9, wherein:

the first timer comprises:
  a first current source having a first terminal and a second terminal;
  a first capacitive element having a respective first terminal coupled to the first terminal of the first current source, and having a respective second terminal;
  a second switch having a respective first terminal coupled to the first terminals of the first capacitive element and the first current source, and having a respective second terminal coupled to the second terminal of the first capacitive element; and
  a first comparator having a first input terminal coupled to the first terminals of the first capacitive element, the first current source, and the second switch, having a reference input terminal, and having an output terminal coupled to a respective first input terminal of the logic circuitry; and the second timer comprises:
  a second current source having a respective first terminal, and having a respective second terminal coupled to the second terminal of the first current source;
  a second capacitive element having a respective first terminal coupled to the first terminal of the second current source, and having a respective second terminal;
  a third switch having a respective first terminal coupled to the first terminals of the second capacitive element and the second current source, and having a respective second terminal coupled to the second terminal of the second capacitive element; and
  a second comparator having a respective first input terminal coupled to the first terminals of the second capacitive element, the second current source, and the third switch, having a respective reference input terminal, and having a respective output terminal coupled to a respective second input terminal of the logic circuitry.

* * * * *